(12) United States Patent
Karidi et al.

(10) Patent No.: US 8,856,109 B2
(45) Date of Patent: Oct. 7, 2014

(54) TOPICAL AFFINITY BADGES IN INFORMATION RETRIEVAL

(75) Inventors: Ron Karidi, Herzeliya (IL); Gal Lavee, Haifa (IL); Avigad Oron, Tel Aviv (IL)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/528,835

(22) Filed: Jun. 21, 2012

(65) Prior Publication Data
US 2013/0346401 A1 Dec. 26, 2013

(51) Int. Cl.
*G06F 17/30* (2006.01)

(52) U.S. Cl.
USPC .......................... 707/723; 707/708

(58) Field of Classification Search
CPC .............. G06F 17/30011; G06F 17/30247; G06F 17/30696; G06F 17/30705; G06F 17/3087; G06F 17/3053; G06F 17/30616; G06F 17/30867; G06F 17/30964
USPC ........................ 707/727–734, 708
See application file for complete search history.

(56) References Cited

U.S. PATENT DOCUMENTS

| | | | |
|---|---|---|---|
| 2002/0078045 A1* | 6/2002 | Dutta | 707/7 |
| 2008/0155440 A1 | 6/2008 | Trevor et al. | |
| 2009/0182723 A1* | 7/2009 | Shnitko et al. | 707/5 |
| 2009/0326970 A1 | 12/2009 | Estrada et al. | |
| 2010/0261520 A1 | 10/2010 | Lempel et al. | |
| 2011/0154400 A1 | 6/2011 | Johnson et al. | |
| 2011/0191416 A1 | 8/2011 | Glazer et al. | |
| 2011/0307483 A1* | 12/2011 | Radlinski et al. | 707/731 |
| 2012/0005209 A1 | 1/2012 | Rinearson et al. | |
| 2012/0052882 A1* | 3/2012 | Gutierrez et al. | 455/456.3 |
| 2012/0310929 A1* | 12/2012 | Patterson et al. | 707/728 |

OTHER PUBLICATIONS

Tang, et al., "Social Influence Analysis in Large-scale Networks", In Proceedings of the 15th ACM SIGKDD International Conference on Knowledge Discovery and Data Mining, Jun. 28, 2009, pp. 807-816.
Arrow, Sarah, "What Newspapers Can Teach You about Blogging", Published on: Apr. 3, 2012, Available at: http://bestblog-gingtipsonline.com/why-you-need-text-funnels-and-images-in-your-blog-posts/#comments. 8 Pages.
Bishop, C.M. "Pattern Recognition and Machine Learning", 2006 p. 205-210.

* cited by examiner

*Primary Examiner* — Debbie Le
(74) *Attorney, Agent, or Firm* — Steve Wight; Judy Yee; Micky Minhas

(57) ABSTRACT

Topical affinity badges in information retrieval is described, for example, where graphical elements are presented together with ranked search results from a search engine, to indicate a degree of association between an author of a document and a topic. In various embodiments, a measure of an author's affinity to a topic is predicted using a machine learning system that takes as input author features derived from documents of the author. In various examples topical affinity scores or labels are used to generate badges and/or to index documents at an index of a search engine. For example, badges may be presented with ranked search results, in pop up displays or in other ways. In examples author features relating to any of recency, frequency and presentation of an author's documents are generated, where presentation features may relate to biographical information such as experience, qualifications, and previous documents.

20 Claims, 10 Drawing Sheets

TOPICAL AFFINITY BADGES IN INFORMATION RETRIEVAL

BACKGROUND

Information retrieval systems, which are often web-based, enable users to search for documents in a fast and efficient manner. Some of the retrieved documents may be written by online authors such as bloggers or reporters and users are typically not familiar with those authors or bloggers. This makes it hard for users to quickly assess the relevance of documents in a results list. This is especially the case where a user is searching for information on a topic that he or she is not familiar with. As the number of authors grows it becomes increasingly difficult for users to find out whether documents are likely to be relevant to him or her.

Online authors create content which is available online. Such authors may write about more than one topic. For example, an author may write restaurant reviews and also reviews about family holidays. In another example, an author may write news and opinions about an Enterprise and may also write reviews about movies.

The embodiments described below are not limited to implementations which solve any or all of the disadvantages of known information retrieval systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Topical affinity badges in information retrieval is described, for example, where graphical elements are presented together with ranked search results from a search engine, to indicate a degree of association between an author of a document and a topic. In various embodiments, a measure of an author's affinity to a topic is predicted using a machine learning system that takes as input author features derived from documents of the author. In various examples topical affinity scores or labels are used to generate badges and/or to index documents at an index of a search engine. For example, badges may be presented with ranked search results, in pop up displays or in other ways. In examples author features relating to any of recency, frequency and presentation of an author's documents are generated, where presentation features may relate to biographical information such as experience, qualifications, and previous documents.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The same reference numerals are used to designate similar parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web-based information retrieval system, the system described is provided as an example and not a limitation. As those skilled in the art will appreciate, the present examples are suitable for application in a variety of different types of information retrieval systems.

Figure 1:
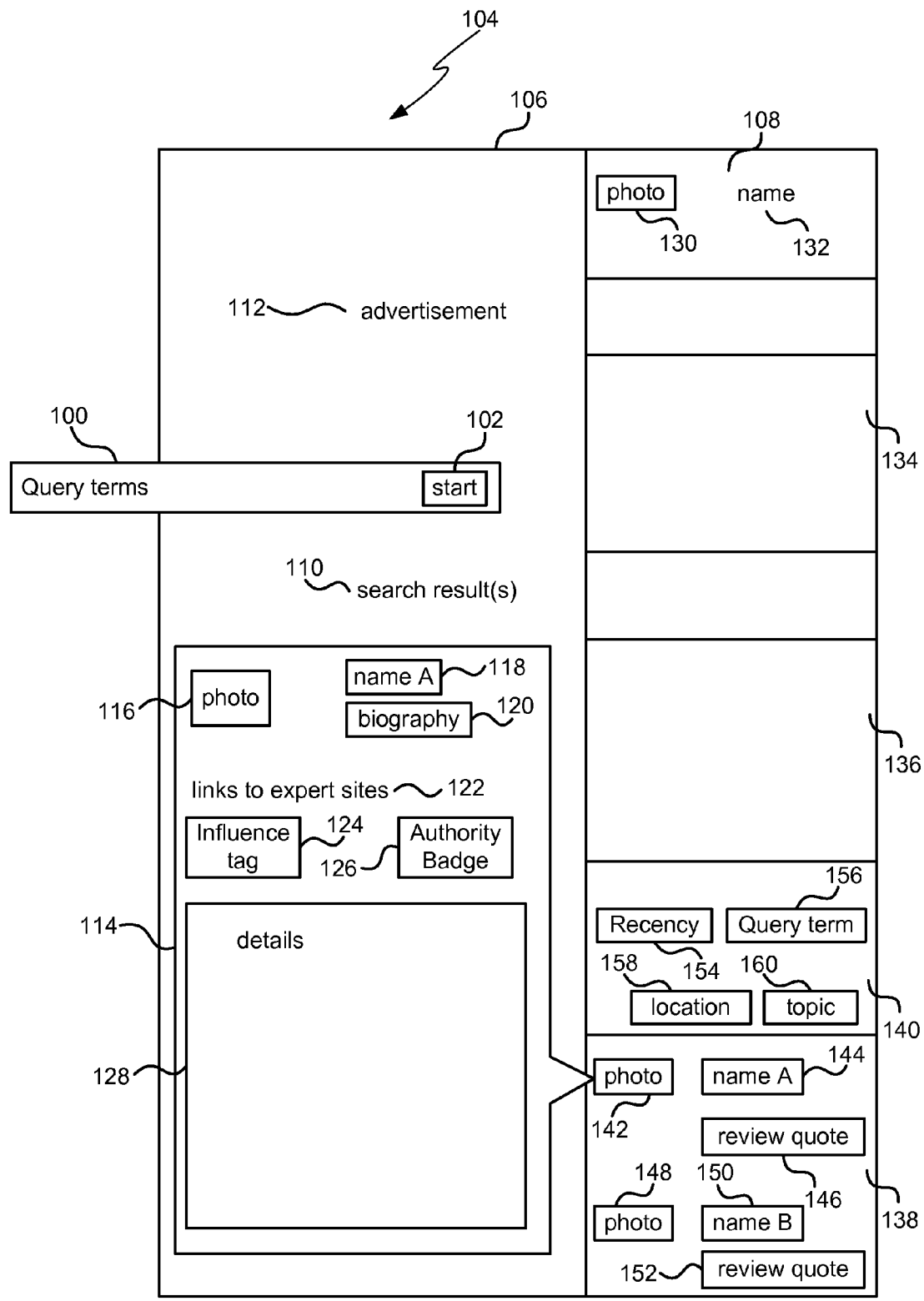
FIG. 1 is a schematic diagram of a graphical user interface of an information retrieval system.

FIG. 1 is a schematic diagram of a graphical user interface 104 of an information retrieval system. A query entry box 100 is provided for a user to enter one or more query terms such as words, phrases, parts of words, numbers, symbols, text, examples of items (in the case of searching by example), or combinations of one or more of these. In the case that the query terms comprise examples of items for searching by example, the examples may be images, videos, audio files, documents, or any other items or parts of items. The query terms may relate to one or more topics. For example, the query terms "Italian restaurants in Seattle" may relate to the topics of "restaurants in Seattle" and "Italian restaurants".

An information retrieval system receives the query and returns a ranked list of search results 110 which are displayed in a column 106 of the graphical user interface. Optionally advertisements 112 may be displayed in the same column. In another column 108 of the graphical user interface, which may be adjacent to the search results column 106 one or more panes 134, 136, 138 may be displayed. At least one pane 138 displays information about people related to the query terms. For example, the people are online authors who have content about a topic of the query terms. The pane 138 may comprise, for author A, a photo 142 (such as a photo of the author), a name A 144, and a review quote 146. The pane 138 may comprise similar information for other authors with content about the topic of the query terms. For example, for author B, photo 148, name B 150 and review quote 152.

When a user selects author A in the pane 138 a pop up display 128 is presented which comprises one or more topical-affinity badges assigned to author A by the information retrieval system. A topical-affinity badge is a graphical element such as an icon, symbol, mark, tag, or other graphical element which represents the strength of association between an author and a topic or subject. In the example of FIG. 1 two examples of topical-affinity badges are given. A first example is an influence tag 124 which displays a topic that author A is influential about. For example, the influence tag 124 may be a rectangular shaded region containing text describing a topic such as "San Diego Restaurants" or any other topic for which author A is influential. A second example is a credentials badge 126 which provides information about author A's credentials with respect to the topic. The credentials of an author may take into account information such as author A's qualifications, track record, and experience. In an example, credentials badge 126 may comprise a logo or trademark associated with a blog and an indication of author A's ranking on that blog (where many authors contribute to the blog).

It is not essential to use the same type of topical-affinity badges as illustrated in FIG. 1. For example, a single topical-affinity badge may be used which represents an author's authority with respect to a topic. Other combinations and types of topical-affinity badges may be used where these represent the strength of association between an author and a topic.

The pop-up display 128 comprises information about author A. For example, a photo 116 of author A, a name A 118 of author A, a biography 120 of author A, links to expert sites 122 of author A (such as author A's web site, author A's news feed link, author A's short message broadcast link), the topical-affinity badges of author A and content details comprising all or part of content that author A has authored with respect to a topic of the query terms. For example, the content may comprise a restaurant review, bibliographic details of journal articles, snippets from publications, images, videos, audio files, or any other content.

In the example of FIG. 1 a pop-up display 128 is used to present information about one or more authors and the topical-affinity badges. However, this is not essential. The author information and/or the topical affinity badges may be integrated with the search results 110, adjacent to the search results 110, presented in a separate part of the user interface display which is not a pop-up display, or presented in other manners. Also, the use of a column 108 of panes 134, 136, 138 is not essential. The information in the pane 138 may be provided in other manners or may be omitted, for example, where topical-affinity badges are integral with the search results 110. In the example of FIG. 1 the panes 134, 136 and the photo 130 (for example, of a user of the interface) and name 132 are examples of other facilities available at the graphical user interface; these are examples only and are optional.

Pane 138 may optionally comprise a title bar 140 comprising a recency field 154, a query term field 156, a location field 158 and a topic field 160. The recency field 154 may be used to display information about the age of content about a topic of the query term which is authored by the authors shown in the pane 138. The query term field 156 may display the query terms entered by the user. The location field 158 may display the name of a geographical location where a geographical location is part of the query terms. The topic field 160 may display the name of a topic of the query terms. For example, if the query terms are "Mexican restaurant San Diego" then the location field 158 may show "San Diego" and the topic field 160 may show "restaurants".

The graphical user interface of FIG. 1 is an example only and other configurations and arrangements are possible in order to present topical-affinity badges to users in conjunction with author information and/or search results.

Figure 2:
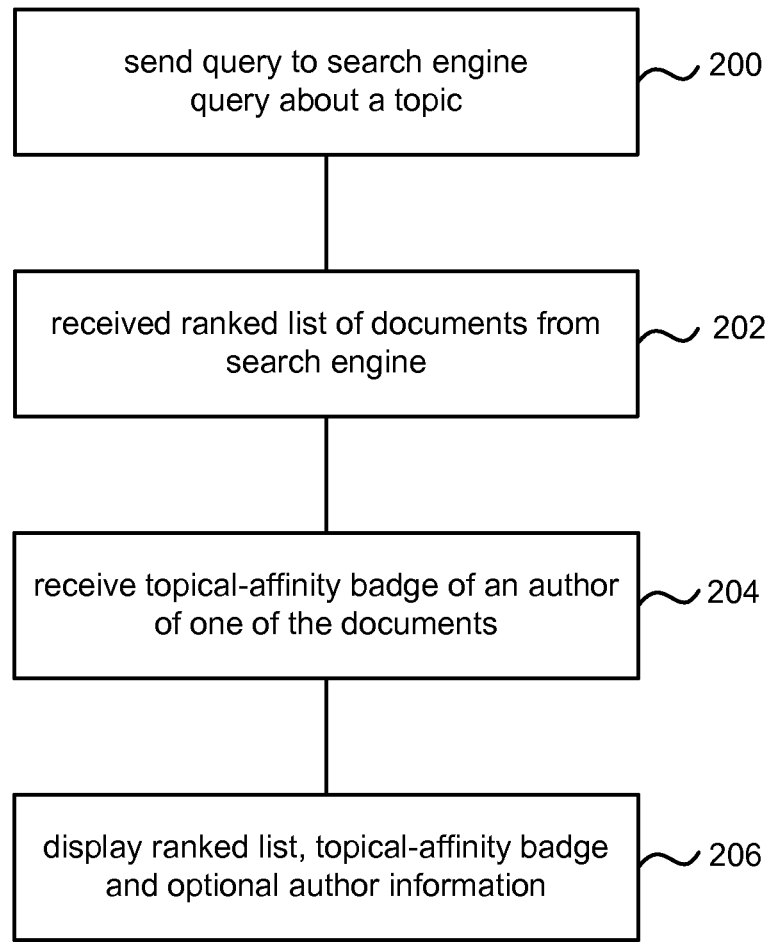
FIG. 2 is a flow diagram of a method of information retrieval at a user device.

FIG. 2 is a flow diagram of a method of information retrieval at a user device. A query is received from a user comprising one or more query terms and is sent 200 from the user device to a search engine using any communications link between the user device and the search engine. The query is associated with one or more topics. The user device receives 202 a ranked list of documents from the search engine where at least one of the ranked list of documents comprises content which has been authored by an author having at least one topical-affinity badge. The user device receives 204 the topical affinity badge and optionally also information about the author. The user device displays 206 the ranked list, the topical affinity badge and optionally the author information. It is not essential for the ranked list and the topical-affinity badge to be displayed simultaneously. The topical affinity badge enables a user to assess the relevance or usefulness of the content which has been authored by the author.

Figure 3:
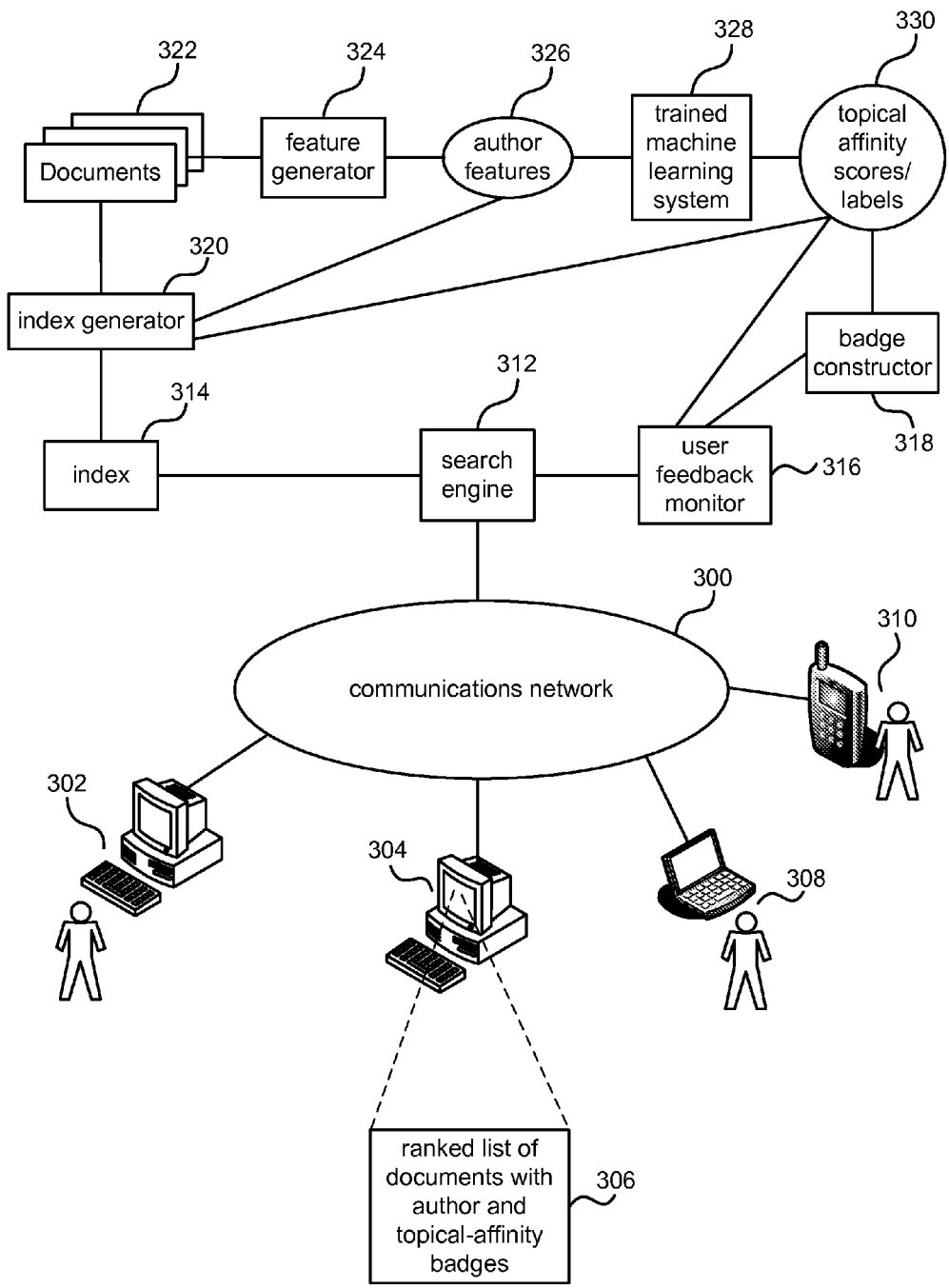
FIG. 3 is a schematic diagram of an information retrieval system.

FIG. 3 is a schematic diagram of an information retrieval system 332 which comprises functionality for constructing topical affinity badges and assigning topical affinity badges to authors. Author features 326 are generated from documents 322 comprising content authored by authors. A machine learning system 328 (which has been trained) calculates topical affinity measures such as scores 330 or labels for authored content. A topical affinity score is a value which indicates the strength of association between an author and a topic or subject. A topical affinity label is an indicator of whether an author has an affinity for a specified topic or not. The topical-affinity scores 330 or labels may be used to assign and construct topical-affinity badges and may also be used by an index generator 320 of the information retrieval system in order that the information retrieval system takes into account topical-affinity scores of authors.

The information retrieval system 332 may communicate with other entities such as user devices 302, 304, 308, 310 over a communications network 300 of any type. The user devices may be personal computers, laptop computers, smart phones, tablet computers, slate computers, or any other user devices capable of displaying a graphical user interface 306 and of communicating with the information retrieval system. The information retrieval system has access to a plurality of documents 322 via the communications network 300 or in any other way. The documents may be any of: text documents, emails, blog posts, short message service messages, social network updates, images, videos, audio files, or other content. The documents may comprise combinations of different types of content. The documents may be identified by a web crawler or in any other way.

An index generator 320 together with a search engine 312 (also known as a query server) provide functionality to enable a systematic way of retrieving documents from the plurality of documents 322 known to the information retrieval system. Similar to an index in the back of a book, the index generator identifies keywords to associate with each document's content. The keywords (and other information) may be used to generate an index 314. When a query comprising those keywords is received the search engine is able to find appropriate documents from the large number of documents 322 that are available using the index. The index generator may take into account information such as how often a keyword is used on a document, which keywords are used in the title or other parts of the document. The index generator may use this information generate an index 314. Other information such as the language that the document is written in and information about how many other documents link to the document concerned may also be used. In at least some examples, the topical affinity scores or labels 330 calculated by the machine learning system 328 are used (together with other information) by the index generator 320 to generate the index 314.

A search engine 312 is used to rank documents in the index 314 on the basis of how well they match user input search terms (query terms). In this way, documents relevant to the user search terms are identified with scores or ranks to indicate the degree of likelihood of relevance.

A user feedback monitor 316 is optionally provided and may monitor explicit user feedback and/or implicit user feedback. Examples of explicit user feedback include but are not limited to click through rates and conversions. Examples of implicit user feedback include but are not limited to hovering a cursor over an item in a results list but not clicking on that item. Data from the user feedback monitor about topical-affinity badges may be used to adjust the topical affinity scores or labels 330 and/or to influence construction of topical-affinity badges by a badge constructor 318. The badge constructor may use one or more templates in order to construct topical-affinity badges using the topical affinity scores or labels 330. For example, the templates may comprise threshold values or ranges of topical-affinity scores that apply in order for a topical-affinity badge to be constructed.

Figure 4:
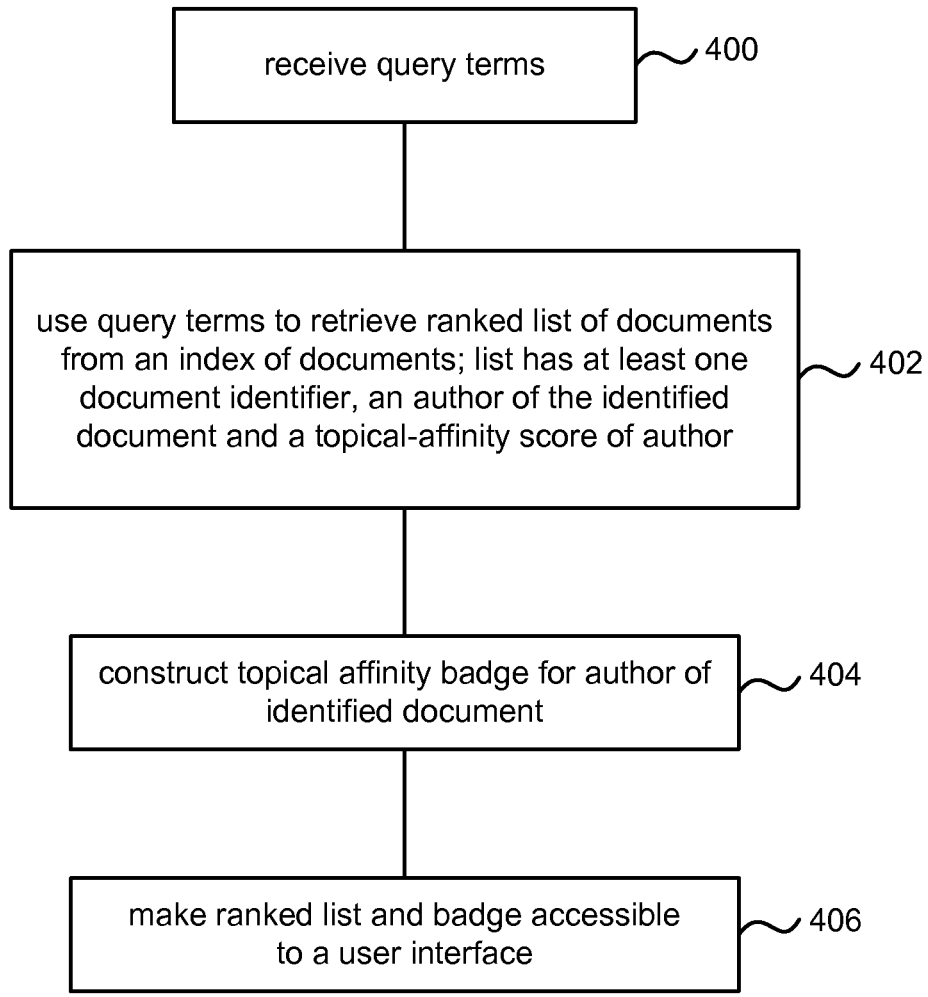
FIG. 4 is a flow diagram of a method of information retrieval at an information retrieval system.
Figure 5:
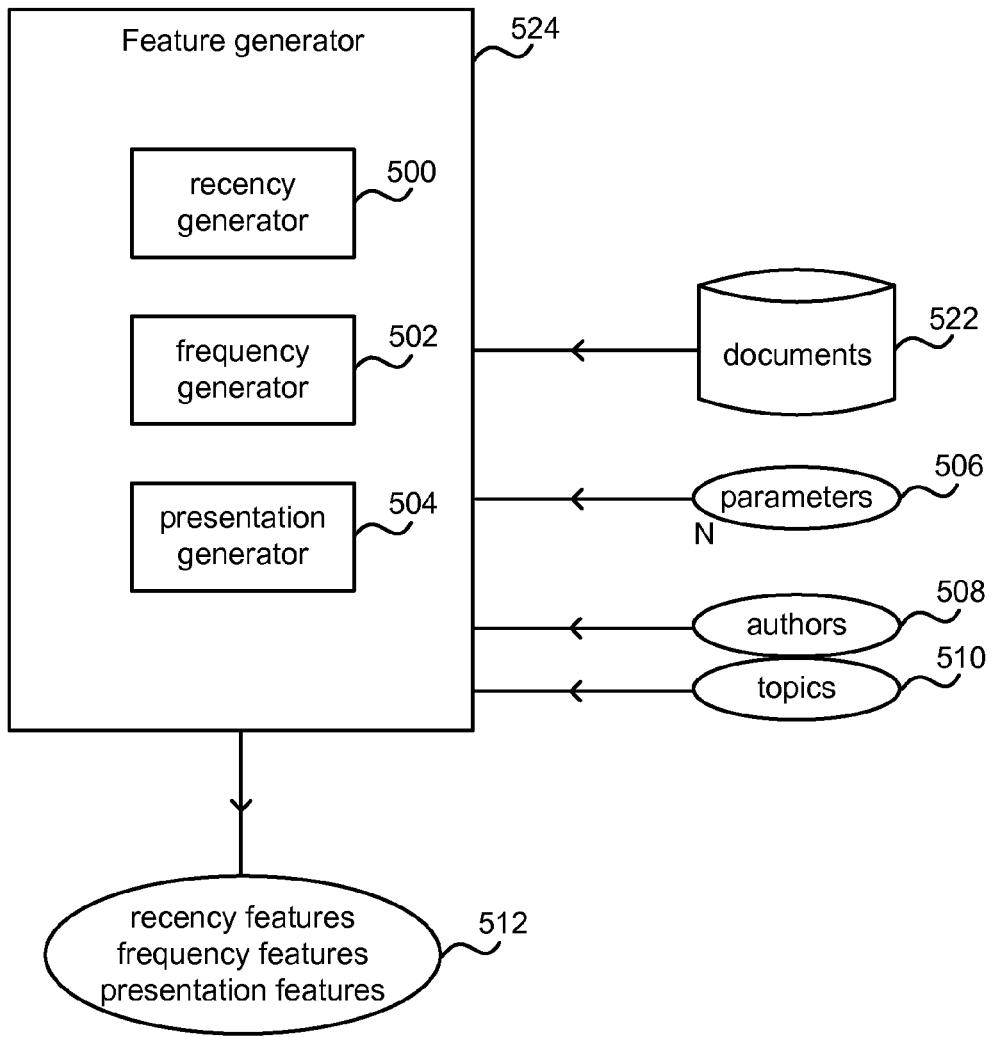
FIG. 5 is a schematic diagram of a feature generator.

FIG. 4 is a flow diagram of a method of information retrieval at an information retrieval system. Query terms are received 400 at a search engine. For example these may be received using a web-based interface to the search engine or in any other way. The search engine uses the query terms to retrieve 402 a ranked list of documents from an index of documents. The index takes into account authors of at least some of the documents and topical affinity scores or labels of at least some of the authors. The ranked list of documents comprises at least one document identifier (such as a link to a document), an author of content of the identified document and a topical-affinity score or label of the author. The information retrieval system constructs 404 a topical affinity badge for the author of the identified document. For example, it uses the topical affinity score or label and one or more templates to construct the topical affinity badge. The information retrieval system makes the ranked list and the topical affinity badge accessible 406 to a user interface. For example, a user interface of a device associated with a user who issued the query.

As mentioned above, a feature generator 324 generates author features from documents 322. An example of a feature generator 324 is illustrated in FIG. 3. It is computer-implemented and may be integral with the machine learning system or any other element of the information retrieval system. Alternatively it may be a separate component as illustrated in FIG. 3. The feature generator may comprise one or more components for generating different types of features. For example, a recency generator 500 which generates features related to recency of content of an author; a frequency generator 502 which generates features related to frequency of content authored by an author; a presentation generator 504 which generates features related to how an author presents or describes him or herself. The feature generator 324 may receive one or more parameters 506 which may be user specified parameter values; or may be pre-set during a manufacturing stage; or may be auto-configured by the feature generator itself. For example, a number of days N to be used by the feature generator components. Another example is a time window to be used by the recency generator. The feature generator 324 may also receive input comprising names of authors 508 and names of topics 510 for which features are to be generated. The feature generator calculates recency features, frequency features and presentation features, which may be numerical values, and provides those values as output 512.

Figure 6:
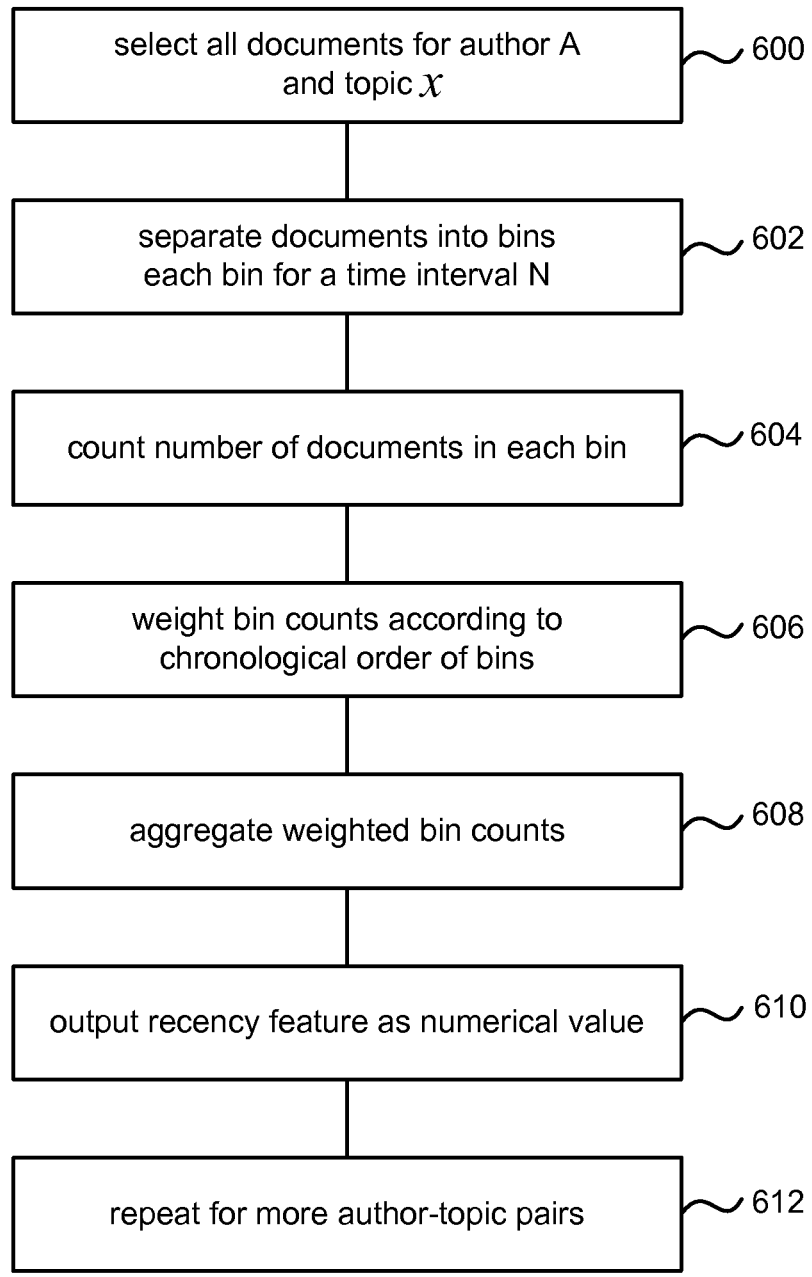
FIG. 6 is a flow diagram of a method of generating recency features.

An example of a method at the recency generator 500 is now described with reference to FIG. 6. Documents are selected 600 for author A and topic x where the author and topic are provided as input to the feature generator. To identify documents authored by a particular author the feature generator may search for the author's name in the documents and/or in meta data associated with the documents. For example, checks may be made near the title and at the end of a post in standard page grids in order to extract an author's name. Meta data such as the html rel tag may be used to find the author's name or a related data feed. Links may be followed to "about" pages, "profile" pages or to a page on a social networking site to find the author's name. To identify documents about a particular topic the feature generator may search for keywords associated with the topic in the documents and/or in meta data associated with the documents. Keywords associated with the topic may be provided as input to the feature generator. For example, the keywords may be provided by human judges or may be found using automated document clustering techniques.

The documents are separated into bins, each bin for a different time interval (in a similar manner to bins of a histogram). Each document has an associated time (or date) and that time is used to allocate the documents to the bins. The time of a document may be presented near the document or in a data feed of the post or document. In some cases the time may be the time at which a web-crawler identified the document or a time at which the document was made available online. The number of documents in each bin is counted 604 and the bin counts are weighted 606 according to a chronological order of the bins. For example, older bins have a lower weight. The weighted bin counts are aggregated 608 for example, by taking an average, finding the median or mode or in any other way. The result of the aggregation is output 610 as the recency feature and comprises a numerical value. The process may be repeated 612 for more author—topic pairs.

Figure 7:
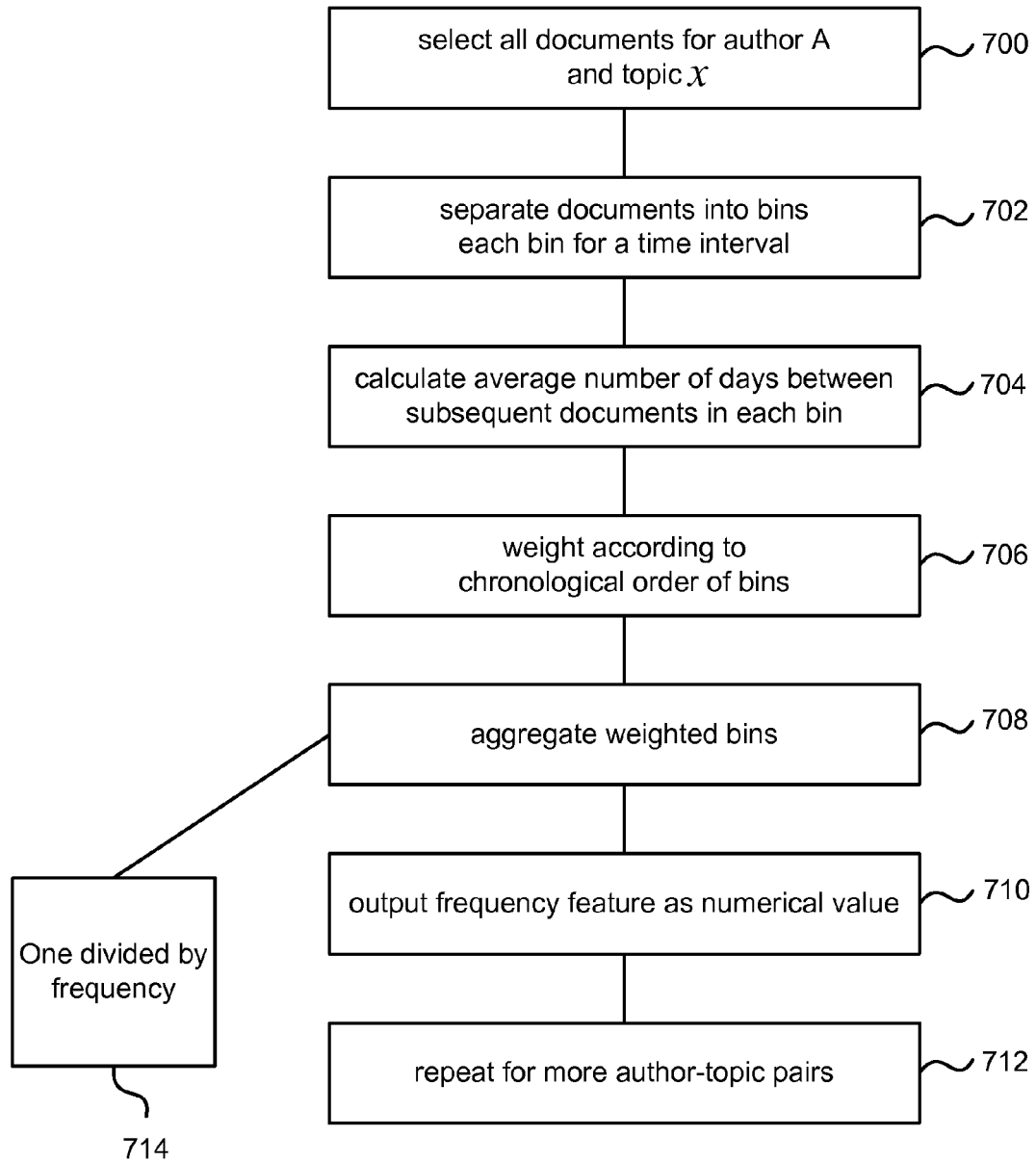
FIG. 7 is a flow diagram of a method of generating frequency features.

An example of a method at the frequency generator 502 is now described with reference to FIG. 7. Documents are selected for a specified author and topic. Any suitable way of selecting the documents by author and topic may be used as described above with reference to FIG. 6. The documents are separated 702 into bins, each bin being for a different time interval. Any suitable way of assessing the time of a document may be used as described above with reference to FIG. 6. The frequency generator 502 calculates 704 a measure of the number of days between subsequent documents in each bin. For example, the mean number of days between subsequent documents in each bin or the median or mode or other measure. Weights are applied 706 according to the chronological order of the bins and the weighted bin days are aggregated 708. The result of the aggregation is the frequency feature which is output 710 as a numerical value. The process may repeat 710 for more author-topic pairs. The frequency generator 502 may also calculate another feature by calculating 1 divided by the aggregation of the weighted bin days and outputting 714 that numerical value.

Figure 8:
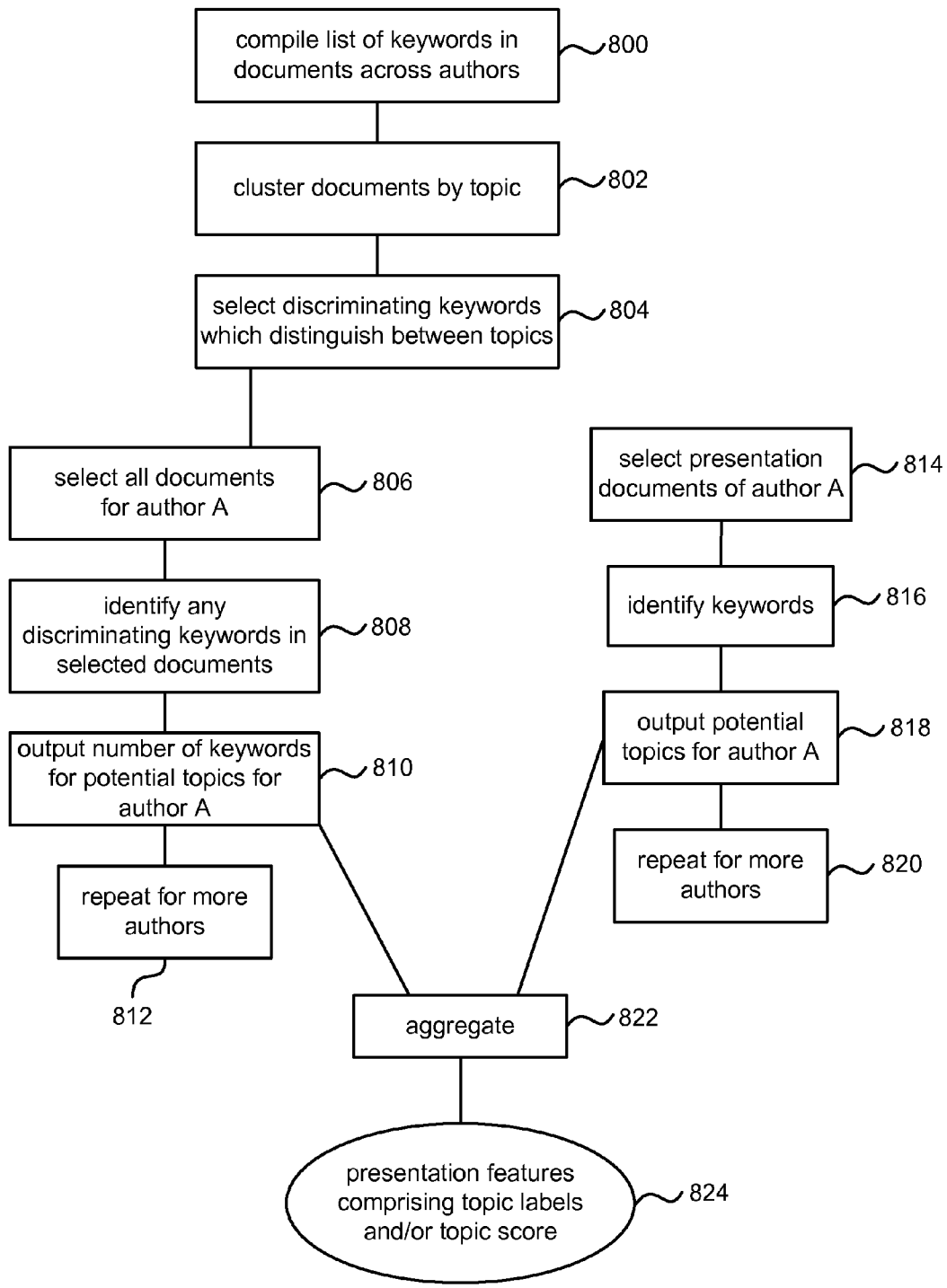
FIG. 8 is a flow diagram of a method of generating presentation features.

An example of a method at the presentation generator 504 is now described with reference to FIG. 8. The presentation generator 504 generates features relating to how an author describes or presents him or herself. For example, an author may have an entry at a social networking service which gives a biography, photograph, list of previous publications, details of qualifications, and/or other information about the author.

The presentation generator may take as input documents authored by a specified author. In some examples these documents are any documents authored by the author. In other examples these documents are presentation document of a specified author. A presentation document is any document (where a document can be any item as mentioned earlier in this specification) which contains presentation information about an author. Presentation information includes but is not limited to biographical details, photographs, publications, qualifications, experience, academic titles, prizes and awards, and publishers with high authority the author writes for.

In some examples the presentation generator itself finds documents authored by specified authors. For example, this may be done by compiling 800 a list of keywords in documents across different authors. An automated system for identifying keywords in documents may be used. The documents are then clustered (into topics) using the keywords using any suitable clustering process such as k-means clustering. Discriminating keywords are then selected 804 which are good at distinguishing between the clusters.

The presentation generator selects 806 documents authored by a specified author and identifies 808 any of the discriminating keywords in those selected documents. A count is made of the number 810 of discriminating keywords for the specified author, for each topic. The count may be a presentation feature of the author for the specified topic. It is also possible for the count information to be aggregated as described in more detail below. The process of counting the keywords by topic for an author may be repeated 812 for more authors.

The presentation generator may select 814 presentation documents of a specified author. Keywords in those documents are identified 816 in any suitable manner, for example, using an automated process which looks for keywords from a pre-specified list in the presentation document, or in other ways. Using the keywords that are identified potential topics may be output 818 for author A, for example, using a table of topics and their associated keywords. This process may be repeated 820 for more authors.

The potential topics from the presentation documents of a specified author and the potential topics from all documents of the specified author may be aggregated 822 to produce presentation features. The aggregation is of any suitable type such as averaging, weighted averaging, median, mode or other aggregation. The presentation features 824 may comprise numerical topic labels and/or numerical topic scores.

Figure 9:
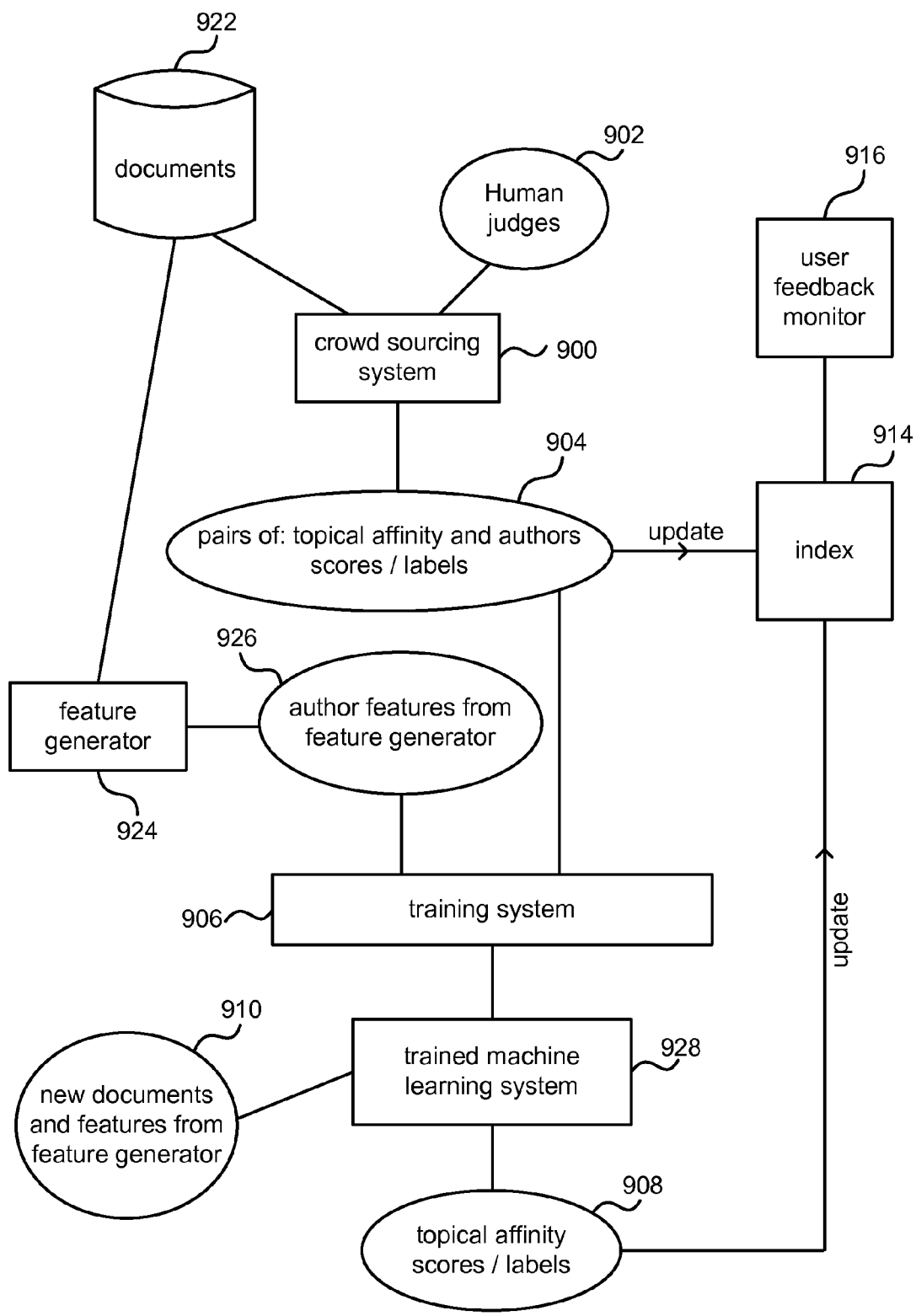
FIG. 9 is a schematic diagram of a system for generating topical affinity scores.

FIG. 9 is a schematic diagram of a system for generating topical affinity scores. This system may use the output of the feature generator and aggregate those features and calibrate them with ground truth data from human judges to produce topical affinity scores. For example, the system comprises a feature generator 924 which may implement the functionality described above with reference to FIGS. 6 to 8. The feature generator generates features 926 of authors from documents 922. The documents 922 are accessible to human judges 902 via a crowd sourcing system 900 or other system which provides human judges with a task of assigning topical affinity scores to authors and records the results. The output of the crowd sourcing system 900 comprises pairs 904 of data, each pair having an author identifier and a topical affinity score or label.

The author features 926 are input to a training system 906. The pairs of data (author identifier—topical affinity score/label) are also input to the training system 906 and these pairs of data comprise so called labeled training data. The training system trains a machine learning system of a type as described in more detail below to produce a trained machine learning system 928. The trained machine learning system 928 is able to receive input comprising new documents 910 and features from the feature generator. The documents are new in the sense that they have not previously been available to the training system 906. The trained machine learning system 928 takes the input comprising the new documents 910 and features and produces topical affinity scores/labels 908 for authors of those documents.

The pairs of data 904 produced by the human judges may be used to update an index 914 of an information retrieval system such as the information retrieval system of FIG. 3. These pairs of data 904 may also be input to a badge constructor such as that of FIG. 3. The topical affinity scores/labels 908 from the trained machine learning system (and associated author identifiers) may also be used to update the index 914 as indicated in FIG. 9 and also as input to a badge constructor such as that of FIG. 3. User feedback from a user feedback monitor 916 may be taken into account by the index 914 as described above with reference to FIG. 3.

The machine learning system may comprise a logistic regression system, a random decision forest classifier, a random decision forest regressor, a support vector machine, or other type of machine learning system which uses labeled training data to predict topical affinity scores or labels of documents authored by specified authors. Logistic regression is a type of regression analysis used for predicting the outcome of a categorical criterion variable based on one or more predictor variables. Gaussian prior distributions may be placed on the regression coefficients. Logistic regression systems are described in detail in "Pattern Recognition and Machine Learning" by Christopher M Bishop, 2006, page 205 to 207. Random decision forests are collections of random decision trees, each tree having a root node, split nodes and leaf nodes. During training the structure of the trees and tests to be used at the split nodes are learnt; and clusters of data accumulate at the leaf nodes. Tests are randomly generated and the test which best splits up the data according to an objective function (such as maximum information gain) is selected during training. Support vector machines are non-probabilistic binary linear classifiers used to predict which of two possible classes an input data falls into.

Figure 10:
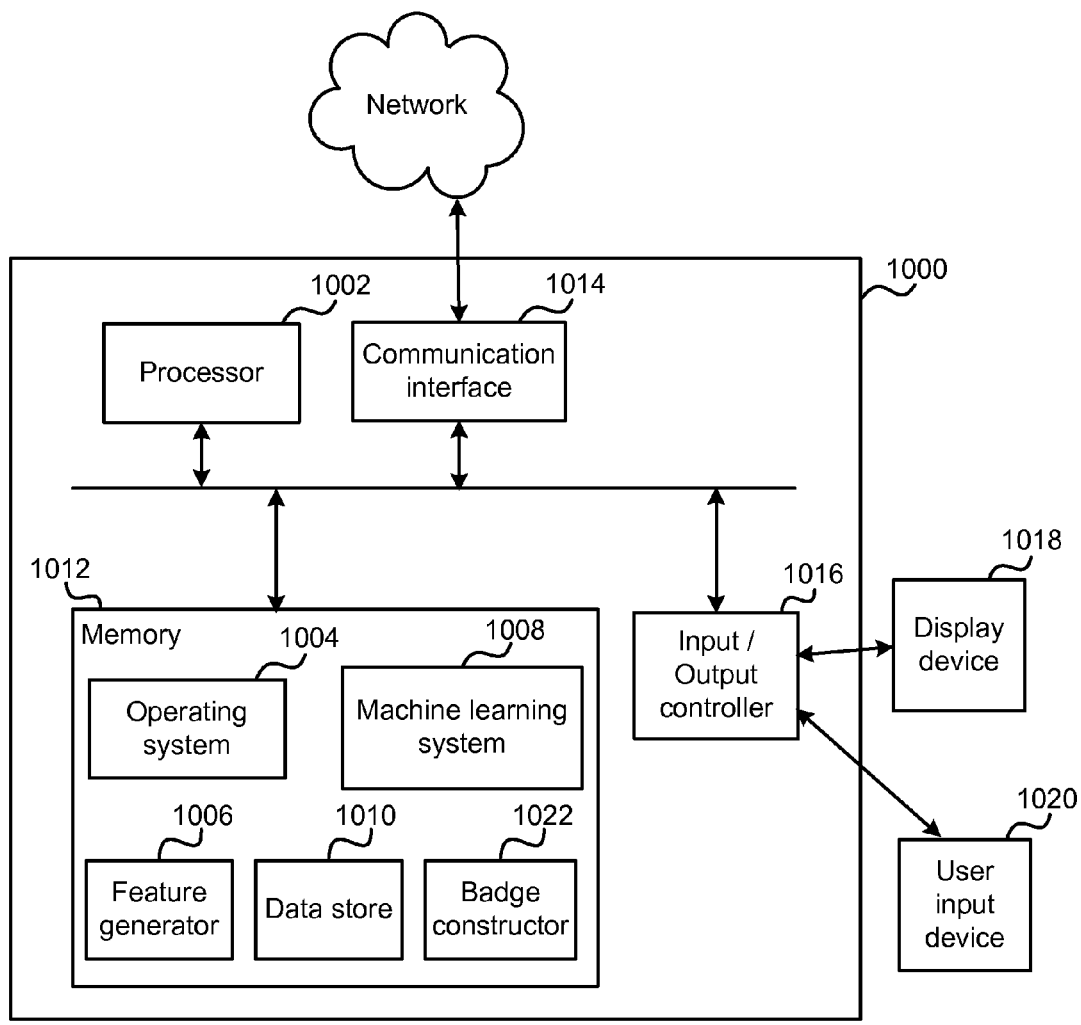
FIG. 10 illustrates an exemplary computing-based device in which embodiments of an information retrieval system may be implemented.

FIG. 10 illustrates various components of an exemplary computing-based device 1000 which may be implemented as any form of a computing and/or electronic device, and in which embodiments of a topical-affinity system may be implemented.

Computing-based device 1000 comprises one or more processors 1002 which may be microprocessors, controllers or any other suitable type of processors for processing computer executable instructions to control the operation of the device in order to calculate topical affinity scores or labels, generate topical affinity badges and optionally also to use topical affinity scores or labels in information retrieval.

Platform software comprising an operating system 1004 or any other suitable platform software may be provided at the computing-based device. A machine learning system 1008 such as a logistic regression system, random decision forest, support vector machine or other machine learning system is arranged to predict topical affinity scores or labels of documents authored by authors. The machine learning system may take as input features generated by a feature generator 1006 from documents authored by authors. A badge constructor 1022 may be provided to construct topical affinity badges from topical affinity scores or labels. A data store 1010 may store thresholds, parameters, labeled training data, feature values or other data.

Alternatively, or in addition, the functionality described herein can be performed, at least in part, by one or more hardware logic components. For example, and without limitation, illustrative types of hardware logic components that can be used include Field-programmable Gate Arrays (FP- GAs), Program-specific Integrated Circuits (ASICs), Program-specific Standard Products (ASSPs), System-on-a-chip systems (SOCs), Complex Programmable Logic Devices (CPLDs).

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to set parameter or threshold values, specify authors and/or topics, provide labels of human judges or for other input. In an embodiment the display device 1018 may also act as the user input device 1020 if it is a touch sensitive display device. The input/output controller 1016 may also output data to devices other than the display device, e.g. a locally connected printing device.

The input/output controller 1016, display device 1018 and optionally the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method at an information retrieval system comprising:
   receiving query terms relating to at least one topic;
   using the query terms to retrieve a ranked list of documents from an index of documents, where the ranked list of documents has at least one document identifier, an author of the identified document and a topical affinity measure of the author and the at least one topic, where a topical affinity measure indicates the strength of association between an author and a topic;
   constructing a topical-affinity badge for the author of the identified document by using the topical affinity measure, the topical affinity badge being a graphical element;
   making the ranked list and the topical-affinity badge accessible to a user interface;
   generating author features from documents available to the information retrieval system, the author features comprising any one or more of: recency features related to the recency of an author's documents, frequency features relating to frequency of an author's document, and presentation features relating to how an author presents him or herself with respect to one or more topics; and
   at least one of:
      generating author features which are recency features by: separating an author's documents into bins according to a time associated with each document, weighting the number of documents in the bins according to a chronological order of the bins, and aggregating the weighted number of documents in each bin;
      generating author features which are frequency features by: separating an author's documents into bins according to a time associated with each document, calculating an average number of days between subsequent documents in each bin, applying a weights according to a chronological order of the bins, and aggregating the weighted average number of days between subsequent documents in each bin;
      generating author features which are presentation features by identifying keywords in documents of an author and counting a number of the identified keywords related to a specified topic, where the identified keywords are discriminating keywords which distinguish between topics; or
      generating author features which are presentation features by identifying keywords in presentation documents of an author and counting a number of the identified keywords related to a specified topic, where the identified keywords are discriminating keywords which distinguish between topics, and where presentation documents of an author are documents in which the author gives biographical details.

2. A method as claimed in claim 1 comprising retrieving the ranked list of documents from an index where the index has been compiled taking into account topical affinity measures of authors of documents.

3. A method as claimed in claim 1 comprising using a trained machine learning system to predict the topical affinity measure of the identified document.

4. A method as claimed in claim 3 comprising training the machine learning system using labeled training data comprising pairs of author identifiers and topical affinity measures for specified topics.

5. A method as claimed in claim 1 comprising generating author features which are recency features by: separating an author's documents into bins according to a time associated with each document; weighting the number of documents in the bins according to a chronological order of the bins; and aggregating the weighted number of documents in each bin.

6. A method as claimed in claim 1 comprising generating author features which are frequency features by: separating an author's documents into bins according to a time associated with each document; calculating an average number of days between subsequent documents in each bin; applying a weights according to a chronological order of the bins; and aggregating the weighted average number of days between subsequent documents in each bin.

7. A method as claimed in claim 1 comprising generating author features which are presentation features by identifying keywords in documents of an author and counting a number of the identified keywords related to a specified topic; where the identified keywords are discriminating keywords which distinguish between topics.

8. A method as claimed in claim 1 comprising generating author features which are presentation features by identifying keywords in presentation documents of an author and counting a number of the identified keywords related to a specified topic; where the identified keywords are discriminating keywords which distinguish between topics; and where presentation documents of an author are documents in which the author gives biographical details.

9. A method as claimed in claim 1 at least partially carried out using hardware logic.

10. A computer-implemented method of information retrieval at a user device comprising:
    sending a query to a search engine, the query being about at least one topic;
    receiving a ranked list of documents from the search engine;
    receiving at least one topical affinity badge of an author of one of the documents, the topical affinity badge being a graphical element representing a strength of association between the author and the at least one topic, at least one of the ranked list of documents or the at least one topical affinity badge having been generated by the search engine by:

using the query to retrieve the ranked list of documents from an index of documents, where the ranked list of documents has at least one document identifier, an author of the identified document and a topical affinity measure of the author and the at least one topic, where a topical affinity measure indicates the strength of association between an author and a topic;

constructing a topical-affinity badge for the author of the identified document by using the topical affinity measure, the topical affinity badge being a graphical element;

generating author features from documents available to the information retrieval system, the author features comprising any one or more of: recency features related to the recency of an author's documents, frequency features relating to frequency of an author's document, and presentation features relating to how an author Presents him or herself with respect to one or more topics; and at least one of:

generating author features which are recency features by: separating an author's documents into bins according to a time associated with each document, weighting the number of documents in the bins according to a chronological order of the bins, and aggregating the weighted number of documents in each bin;

generating author features which are frequency features by: separating an author's documents into bins according to a time associated with each document, calculating an average number of days between subsequent documents in each bin, applying a weights according to a chronological order of the bins, and aggregating the weighted average number of days between subsequent documents in each bin;

generating author features which are presentation features by identifying keywords in documents of an author and counting a number of the identified keywords related to a specified topic, where the identified keywords are discriminating keywords which distinguish between topics; or generating author features which are presentation features by identifying keywords in presentation documents of an author and counting a number of the identified keywords related to a specified topic, where the identified keywords are discriminating keywords which distinguish between topics, and where presentation documents of an author are documents in which the author gives biographical details; and displaying the ranked list of documents and the topical affinity badge at a graphical user interface of the user device.

11. A method as claimed in claim 10 comprising receiving the ranked list of documents from an index at the search engine where the index has been compiled taking into account topical affinity measures of authors of documents.

12. A method as claimed in claim 10 comprising displaying the topical affinity badge in a pop-up display together with information about the author.

13. A method as claimed in claim 10 comprising receiving user feedback in response to displaying the ranked list of documents and the topical affinity badge and sending the user feedback to the search engine.

14. An information retrieval system comprising:

an input arranged to receive query terms relating to at least one topic;

a search engine arranged to use the query terms to retrieve a ranked list of documents from an index of documents, where the ranked list of documents has at least one document identifier, an author of the identified document and a topical affinity measure of the author and the at least one topic, where a topical affinity measure indicates the strength of association between an author and a topic, where the index has been compiled taking into account topical affinity measures of authors of documents;

a processor arranged to construct a topical-affinity badge for the author of the identified document by using the topical affinity measure, the topical affinity badge being a graphical element;

an output arranged to make the ranked list and the topical-affinity badge accessible to a user interface;

a feature generator arranged to generate author features from documents available to the information retrieval system, the author features comprising any one or more of: recency features related to the recency of an author's documents, frequency features relating to frequency of an author's document, and presentation features relating to how an author presents him or herself with respect to one or more topics, wherein the feature generator is arranged to generate at least one of the following:

presentation features by identifying keywords in presentation documents of an author and counting a number of the identified keywords related to a specified topic, where the identified keywords are discriminating keywords which distinguish between topics, and where presentation documents of an author are documents in which the author gives biographical details;

recency features by separating an author's documents into bins according to a time associated with each document, weighting the number of documents in the bins according to a chronological order of the bins, and aggregating the weighted number of documents in each bin;

frequency features by separating an author's documents into bins according to a time associated with each document, calculating an average number of days between subsequent documents in each bin, applying a weights according to a chronological order of the bins, and aggregating the weighted average number of days between subsequent documents in each bin; or generating author features which are presentation features by identifying keywords in documents of an author and counting a number of the identified keywords related to a specified topic, where the identified keywords are discriminating keywords which distinguish between topics.

15. A system as claimed in claim 14 comprising a machine learning system trained to predict topical affinity measures of authors using features derived from documents of the authors.

16. A system as claimed in claim 14 where the machine learning system has been trained using labeled training data comprising features derived from documents of specified authors and topical affinity measures for specified topics.

17. A system as claimed in claim 14, the feature generator being arranged to generate presentation features by identifying keywords in presentation documents of an author and counting a number of the identified keywords related to a specified topic; where the identified keywords are discriminating keywords which distinguish between topics; and where presentation documents of an author are documents in which the author gives biographical details.

18. A system as claimed in claim 15 the machine learning system being at least partially implemented using hardware logic selected from any one or more of: a field-programmable gate array, a program-specific integrated circuit, a program-specific standard product, a system-on-a-chip, a complex programmable logic device.

19. A system as claimed in claim 14, the feature generator being arranged to generate recency features by separating an author's documents into bins according to a time associated with each document, weighting the number of documents in the bins according to a chronological order of the bins, and aggregating the weighted number of documents in each bin.

20. A system as claimed in claim 14, the feature generator being arranged to generate frequency features by separating an author's documents into bins according to a time associated with each document, calculating an average number of days between subsequent documents in each bin, applying a weights according to a chronological order of the bins, and aggregating the weighted average number of days between subsequent documents in each bin.

* * * * *